United States Patent [19]
Steinberg et al.

[11] 4,229,990
[45] Oct. 28, 1980

[54] TRANSMISSION OF SHIPS

[75] Inventors: Hans Steinberg, Witten; Wolfgang Sudhoff, Dortmund, both of Fed. Rep. of Germany

[73] Assignee: Mannesmann Aktiengesellschaft, Düsseldorf, Fed. Rep. of Germany

[21] Appl. No.: 909,006

[22] Filed: May 24, 1978

[30] Foreign Application Priority Data

May 27, 1977 [DE] Fed. Rep. of Germany ....... 2724783

[51] Int. Cl.³ .............................................. F16H 3/14
[52] U.S. Cl. ...................................... 74/377; 74/410; 74/421 R
[58] Field of Search ............. 74/331, 377, 410, 421 R, 74/424.5

[56] References Cited

U.S. PATENT DOCUMENTS

| | | | |
|---|---|---|---|
| 1,151,762 | 8/1915 | Day | 74/377 |
| 2,171,715 | 9/1939 | Sinclair | 74/377 |
| 2,370,002 | 2/1945 | Brecht | 74/410 |
| 2,982,144 | 5/1961 | Wallgreen | 74/410 |
| 3,126,752 | 3/1964 | Bolster | 74/331 |
| 4,044,632 | 8/1977 | Wildhaber | 74/410 |

*Primary Examiner*—Peter M. Caun
*Attorney, Agent, or Firm*—Smyth, Pavitt, Siegemund, Jones & Martella

[57] ABSTRACT

An engine driven shaft is connected to an input gear of the transmission which, in turn, is geared to a power branching cascade, providing either for axial branching first followed by lateral branching or a reverse sequence of branching, obtaining in either case four outputs provided by pinions which mesh in pairs two large spur gears for re-combining all branches. These large spur gears are on a common shaft which is the transmission output.

13 Claims, 4 Drawing Figures

(A-A)

(B-B)

TRANSMISSION OF SHIPS

BACKGROUND OF THE INVENTION

The present invention relates to a transmission for a ship and its propulsion and drive system.

Transmissions in ship propulsion systems are usually constructed to have parallel positioned drive and driven shafts, i.e. the shafts are arranged alongside of each other. Known transmissions include also power branching in the transmission housing. The transmission generally is provided for reducing the rotational speed as between drive shaft (input) and drive shaft (output). The spur gears needed for such a transmission are frequently of rather large dimensions but available machine tools are unable to make the teeth because they are not sufficiently powerfull. Power branching in the transmission permits utilization of smaller gears.

DESCRIPTION OF THE INVENTION

It is an object of the present invention to provide a new and improved large power transmission for considerable speed reduction.

In accordance with the preferred embodiment of the present invention, it is suggested to provide two relatively large diameter spur gears on an output shaft for driving the same; each of these spur gears meshes with two pinions so that there are altogether four pinions, which represent the outputs of a cascaded power branching provided by a gear means which receives a single rotational input and branches power twice, e.g. first axially and again laterally or vice versa. Axial branching is to mean that a driven shaft has two axially spaced gears both of which drive further gears. Lateral branching is to mean that a driven gear meshes two gears which in turn drive separately other components of the transmission. Twofold axial and twofold lateral branching in either sequence produces four outputs accordingly which are used to drive the above-mentioned pinions.

The combination of lateral and axial power branching optimizes in fact the power branching under advantageous use of the available space. It is a specific feature of the invention that the two large spur gears, which in fact recombine the branches, are provided with similarly oriented helical gears which ensure uniform loading of the four pinions even if the shaft of the two spur gears experiences thrust from the output. Opposite orientation is commonly used in combining gears, but in the present case, such orientation would tend to de-equalize the load in the case of thrust.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
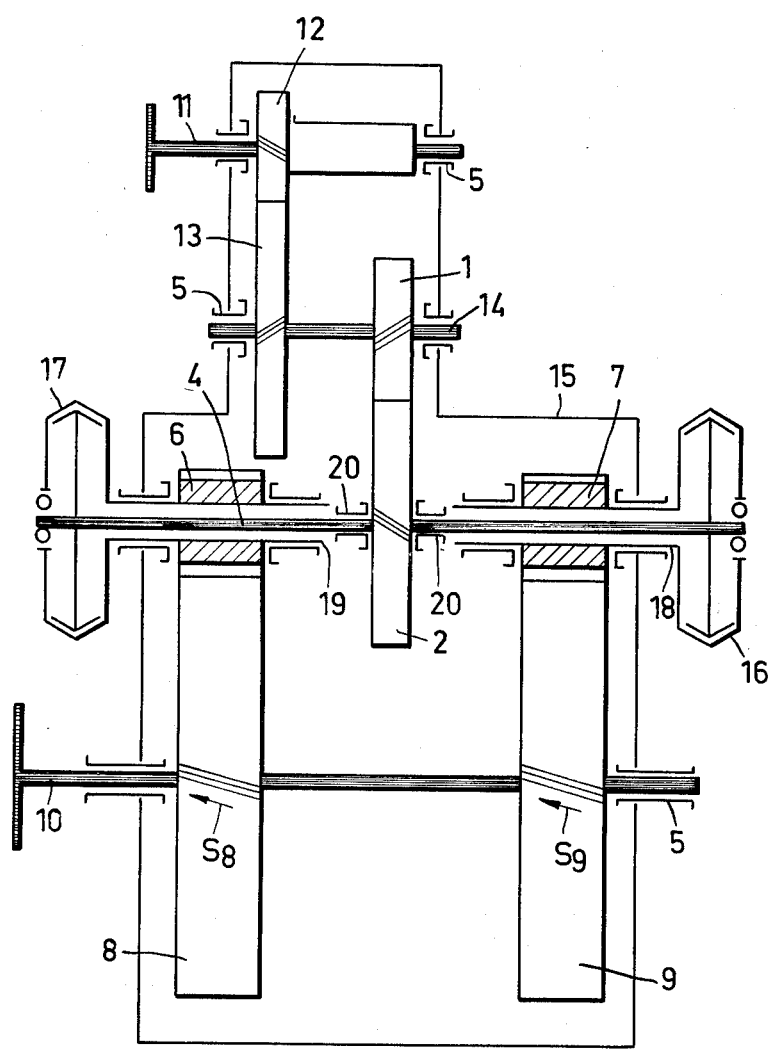
FIG. 1 is a somewhat schematic section view of a transmission in accordance with the prefered embodiment, the section has been taken along line A—A of FIG. 2 and showing two sequential, by-two power branchings.

Proceeding now to the detailed description of the drawings, the figures show a reversible reducing gear with two by twofold power branching, i.e. power is twice branched to obtain four branches for forward propulsion. Branching is duplicated to obtain four additional branches for reverse driving and propulsion. The forward propulsion mode uses stage V (FIG. 2) and the reverse and propulsion mode drive is carried out by stage R. The view of FIG. 2 does not show directly the first lateral branching and, therefore, appears to be similar to a system with single power branching only. The section as per FIG. 1 runs through the one branch for the forward mode transmission, the other branch, and the branches for reverse propulsion are analogously constructed as will be explained below.

The transmission gear as depicted shows an external drive shaft 11 journalled in bearings in a case or housing 15; the same is true for the other shafts of the system. A gear 12 is mounted on shaft 11 and meshes a gear 13 on a shaft 14. Reference numeral 5 refers to the several bearings for journalling the shafts. Shaft 14 in turn carries the driving gear 1 which (see FIG. 2) meshes two spur gears 2 and 3 which are disposed side by side. All these gears are helical gears. Shaft 11 is driven by the ship's engine.

A first intermediate shaft 4 carrying gear 2 is journalled and mounted in housing 15 by means of bearings. Shaft 4 is rather long and its ends respectively run into clutches 17 and 16 and drive inputs of these clutches. These clutches are energized during forward propulsion and connect the intermediate shaft 4 with two hollow pinions 6 and 7, respectively, on hollow shafts 19 and 18, being axially aligned. These hollow components are traversed by the shaft 4, and particularly the two pinions are disposed to one side and the other of spur gear 2. The pinions 6 and 7 are, therefore, driven in the forward mode and mesh large gears 8 and 9, respectively, and these large gears 8 and 9 are connected to the driven or output shaft 10 of the system. The gears 8 and 9 are axially aligned and are provided with similar helical gearings. The axial thrust of the gearing is taken up by a rigidly connected propeller shaft thrust bearings (not shown).

Figure 2:
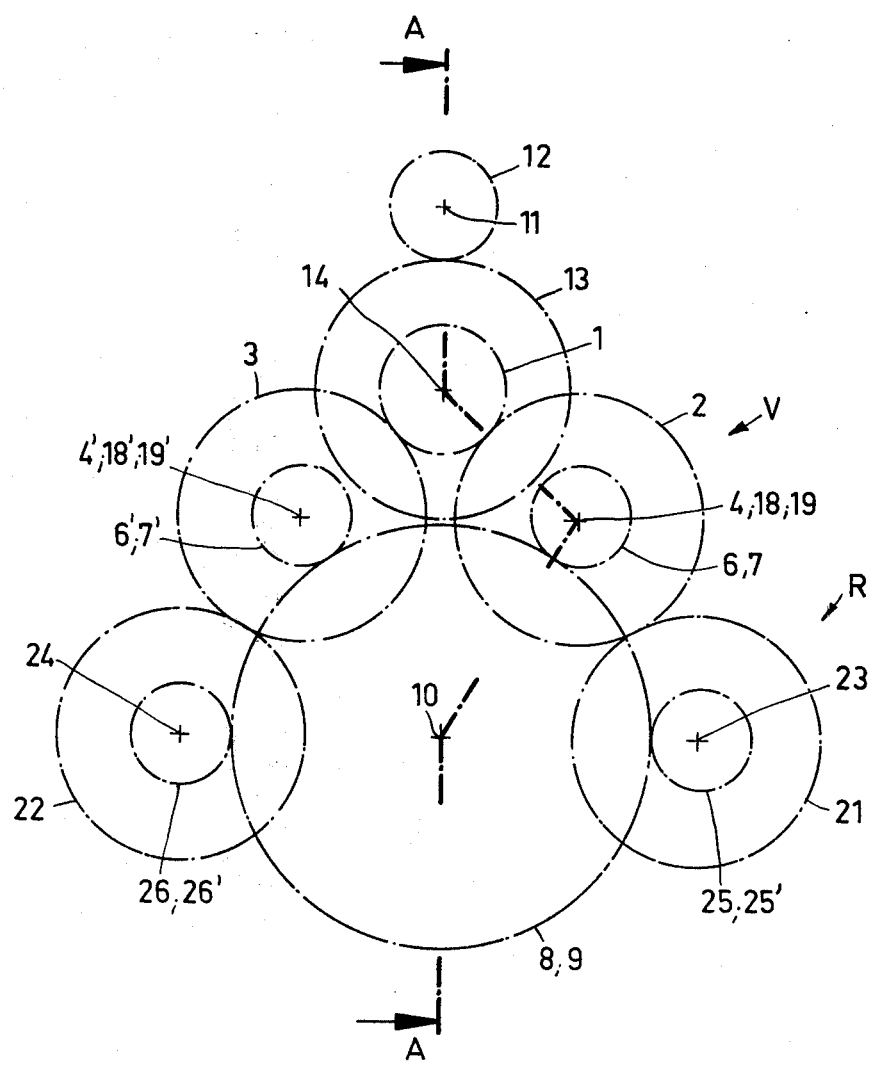
FIG. 2 is a front view of the transmission shown in FIG. 1.

FIG. 2 identifies the several gears by pitch circles and shafts are identified by the axes and depicted as crosses. It can readily be seen that the assembly as shown in FIG. 1 is actually present in the plurality, e.g. fourfold. Particularly stage V has a second gear 3 (in addition to gear 2) which is a second, lateral power transmission branch and includes, as symbolically denoted, a second intermediate shaft 4', axially aligned hollow shafts 18' and 19', and pinions 6', 7', which also mesh with the large gears 8 and 9. That is to say, large gear 8 meshes with the two mutually laterally offset pinions 6 and 6' in a common plane, thereby re-combining two power transmission branches, and large gear 9 meshes with the two similarly laterally offset pinions 7 and 7' also in a common plane, thereby recombining two other power transmission branches. Gears 8 and 9 as mounted on a common shaft provide further and final power branch combining. The second intermediate shaft 4' has also axial extensions traversing the hollow shafts 18', 19', and cooperating with clutches analogous to clutches 16, 17.

It can thus be seen that drive shaft 11 drives the shaft 14 and pinion 1 thereon. That pinion drives the two gears 2 and 3 and the two intermediate shafts 4 and 4' to thereby establish and provide lateral power branching. Each of these shafts 4 and 4' provides additionally axial power branching branching. Whenever the clutches 16 and 17, as well as the second pair of such clutches cooperating with shaft 4' are energized, pinions 6 and 6' drive gear 8, and pinions 7 and 7' drive gear 9. The shaft 10 will be driven for forward mode propulsion by the two gears 8 and 9.

As far as the reverse mode is concerned, clutches 16, 17 etc. are disconnected; but spur gears 2 and 3 mesh also with additional gears 21 and 22 thereby reversing the rotation. The gears 21, 22 sit also in intermediate shafts 23 and 24 (similar to 4 and 4') also cooperating with clutches analogous to 16, 17, and pinions such as 6 and 7. These additional reverse mode pinions are identified in FIG. 2 by 25, 25' and 26, 26'. These pinions now mesh also the two large gears 8 and 9 and drive them in the opposite directions. In other words, the entire arrangement for reverse propulsion is basically a duplication of the forward system except that reversing gears 21 and 22 are interposed.

It can readily be seen, therefore, that FIG. 1 could also be understood to depict, in substance, a section in a section plane which veers off at right angles at shaft axis 10 (FIG. 2), traverses the axis of intermediate shaft 23, runs up vertically (bypassing 2) and veers back to intercept 14. The entire system, therefore, includes four such intermediate shafts with extensions and two clutches and two pinions per intermediate shaft. All branches are combined in the output shaft 10.

Figure 3:
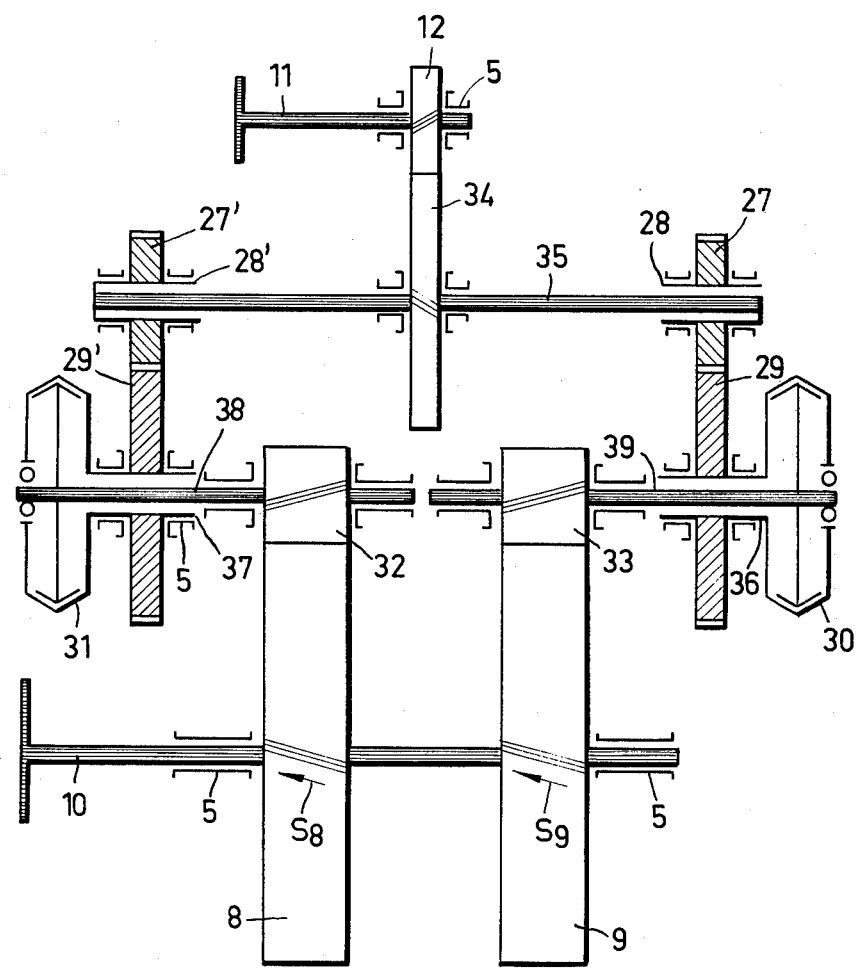
FIG. 3 is a view similar to FIG. 1 but taken along line B—B in FIG. 4, and showing a modified form of power branching.
Figure 4:
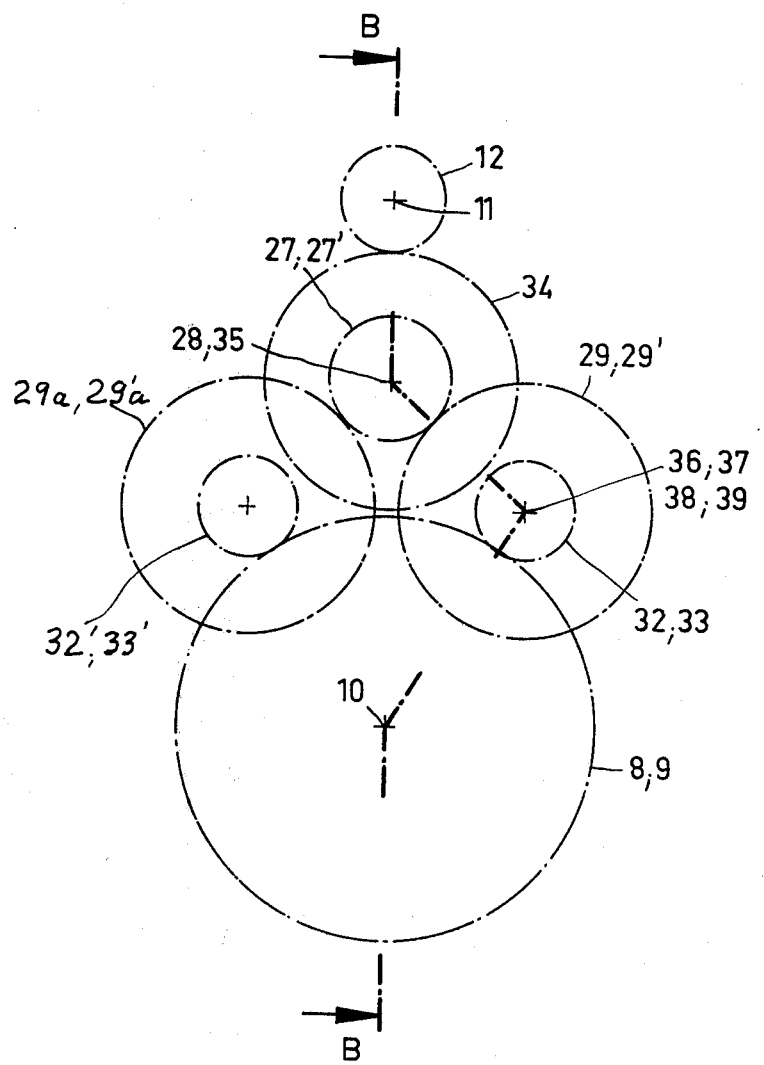
FIG. 4 is a front view of the transmission shown in FIG. 3.

It can thus be seen that in each mode (forward and reverse) cascaded power branching involves first a lateral branching and transmission of power into two branches (1 meshing 2 and 3), and secondly, axial branching of power transmission (6,7 and 6', 7'). In the next example, the situation is reversed, there is first axial branching and each branch is laterally branched, the transmission and gear means involved being also cascaded. Turning therefore to FIGS. 3 and 4, the transmission has also an input shaft 11; the housing is merely shown indirectly through the several bearings 5. Also, shaft 11 carries and drives a gear 12. That gear 12 now meshes a gear 34 on a long shaft 35. Hollow shafts 28 and 28' are connected to the two opposite ends of shafts 35 and carry gears 27, 27', respectively. This arrangement provides for the axial power branching in this particular embodiment.

Each of the gears 27, 27' is the drive element of two lateral power branchings, only one branch is directly visible in FIG. 3, the second one can readily be deduced from FIG. 4. Gear 27 meshes with two gears 29 (FIGS. 3, 4) and 29a (FIG. 4 only), and gear 27' meshes with gears 29' and 29'a accordingly.

Considering one set of branches only, gears 29 and 29' sit on hollow shafts 36 and 37, respectively, which are connected each to one part of clutches 30 and 31. The counterpart in each clutch is connected to a shaft, shaft 38 for clutch 31 and shaft 39 for clutch 30. There are similar clutches and shafts for the laterally offset branch inputs 29a, 29'a. Thus, there are four output shafts of the branching gearing, 38 and 39, and two additional ones extending parallel to 38 and 39, and coaxial to each other.

Shafts 38 and 39 carry pinions 32, 33, respectively, which mesh with the large spur gears 8 and 9. A second set of such pinions 32', 33' meshes additionally with the spur gears so that each spur gear (8, 9) is driven by the two pinions. The output shaft combines the torque as received by the two gears 8 and 9 as aforedescribed.

FIGS. 3 and 4 do not show reverse mode power branching. This can readily be provided for by additional gears analogous to 29, 29', 29a and 29'a and meshing those, just as gears 21 and 22 reverse the rotation of gears 2 and 3 in FIGS. 1 and 2. Additional four clutches and additional pinions meshing gears 8 and 9 permit reverse mode operation with a fourfold branching.

Correspondingly, one can omit the reverse mode in either case if that is desired. The invention is not limited to the embodiments described above but all changes and modifications thereof not constituting departures from the spirit and scope of the invention are intended to be included.

We claim:

1. A transmission for a ship's drive system having a first, engine-driven shaft as input of the transmission and a second shaft as output thereof, comprising:
   a pair of relatively large diameter spur gears, drivingly connected to the second shaft for driving the second shaft; first and second pairs of pinions, the pinions of each pair being coaxially arranged and respectively meshing the spur gears of the pair so that each spur gear meshes with two of the pinions;
   first gear means connected to be driven by the first shaft; and
   second gear means which includes cascaded transmission means (a) and (b), one of the transmission means (a) and (b) providing for axial power branching, the other one being gear means providing lateral power branching, the transmission means (b) including four driven shafts respectively connected to the pinions of said first and second pairs, the transmission means (a) including gear means drivingly connected to and gearingly meshing with the first gear means.

2. A transmission as In claim 1, said means (b) includes four clutches for connecting and disconnecting the pinions from the gearing means.

3. Transmission as in claim 1, said means (a) including two spur gears meshing with the first gear means for obtaining lateral power branching, each of said two spur gears of the means (a) being on a separate shaft, the means (b) being constructed to to connect the two ends of each of the two shafts of the means (a) respectively to the four pinions to obtain the axial power branching.

4. Transmission as in claim 4, the pinions being hollow and respectively traversed by said shafts, there being four clutch means for respectively connecting the shaft ends to the pinions.

5. Transmission as in claim 1, said means (a) including a spur gear meshing the first gear means, further including a shaft for the latter spur gear and further carrying two gears to obtain axial power branching;
   a first and second pair of further gears included in the means (b), the gears of each pair of further gears meshing respectively with said two gears of the means (a) and to provide for lateral power branching; and means included in the means (b) for drivingly connecting the gears of the further pairs respectively to the four pinions.

6. A transmission as in claim 5, said means for drivingly connecting including four clutches for respectively connecting the pinions to and disconnecting them from the first gear means.

7. A transmission as in claim 1, said large spur gears having similar helical gearing.

8. A transmission as in claim 1, and including four additional pinions respectively meshing in pairs with the large diameter spur gear, further
  including third gear means which includes cascaded gear means similar to the gear means (a) and (b) and including four further driven shafts for the four additional pinions;
  additional gear means drivingly connecting the third gear means to the first gear means so that the output shaft be driven in the reverse; and
  clutch means interposed between the pinions and the first gear means so that only the first mentioned four pinions or the four additional pinions be driven.

9. A transmission for a ship's drive system having a first, engine-driven shaft as input of the transmission and a second shaft as output thereof, comprising:
  a first gear, drivingly connected to the first shaft and being driven by the shaft;
  first means geared to the first gear to obtain lateral power branching, including two gears driven by the first gear:
  second and third means respectively drivingly connected to the two gears, each of the second and third means providing for axial power-branching resulting in four driven outputs, said four driven outputs including respectively four pinions, of which two rotate in a common plane and the other two rotate in another common plane; and
  two large spur gears on the output shaft and respectively disposed in said common planes for driving the output shafts, each of the large spur gears meshing with respective two of the four pinions so that the four pinions drive the spur gears in pairs.

10. A transmission as in claim 9, each of the second and third means including a shaft, each shaft extending from both sides of the respective one of the two gears, there being four shaft ends accordingly, the shaft ends respectively traversing the pinions, there being four means for connecting the pinions to the shaft ends.

11. a Transmission as in claim 10, the four means being four clutches.

12. A transmission for a ship's drive system having a first engine drive shaft as input of the transmission and a second shaft as output thereof, comprising:
  a first gear drivingly connected to the first shaft and being driven by the first shaft;
  a shaft for the first gear and extending axially from the first gear;
  second and third gears on the shaft to obtain axial power branching;
  first and second means respectively geared to the second and third gears and providing for lateral power branching, there being four driven outputs accordingly, said four driven outputs including respectively four pinions, of which two rotate in a common plane and the remaining two rotate in another common plane; and
  two large spur gears on the output shaft for driving the output shafts, each of the large spur gears meshing with respective two of the four pinions which rotate in a common plane so that the four pinions drive the spur gears in pairs.

13. A transmission as in claim 12, each of said second and third means including two shafts on which said pinions are mounted, further including two hollow gears traversed respectively by the two shafts, the two hollow gears of the first means meshing the second gear, and the two hollow gears of the second means meshing the third gear.

* * * * *